March 29, 1960  F. W. SCHREMP ET AL  2,930,466
MARGIN CONTROL FOR TYPEWRITERS
Original Filed April 7, 1951  7 Sheets-Sheet 2
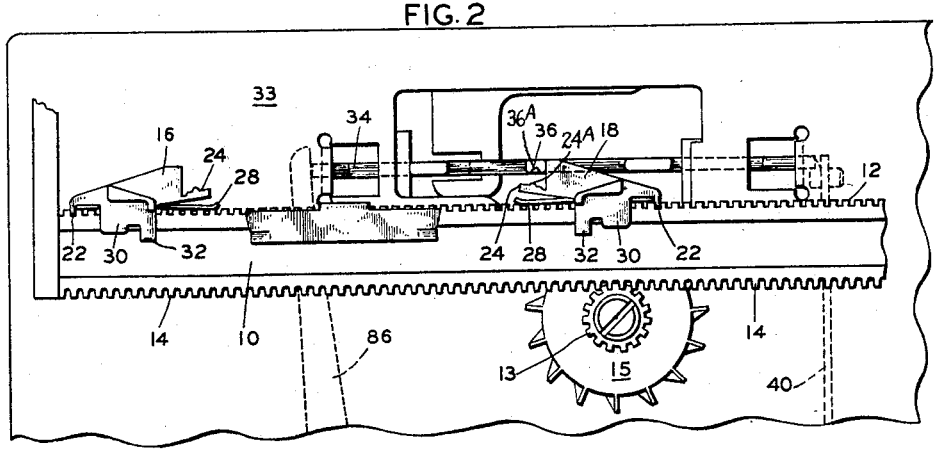
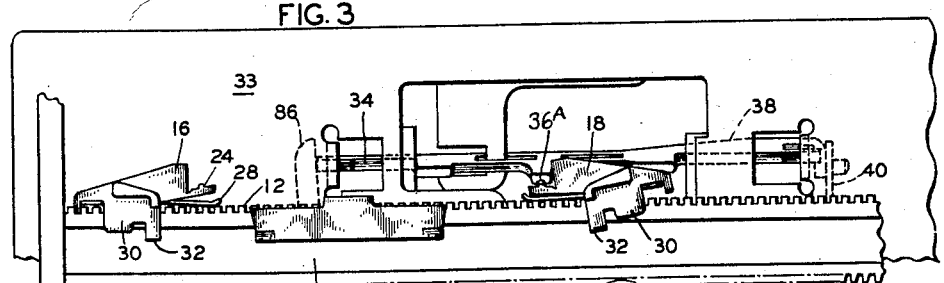
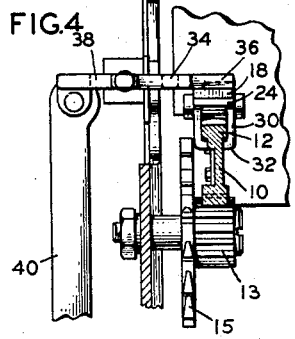
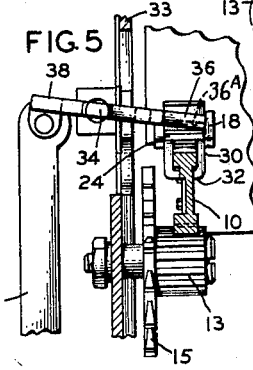
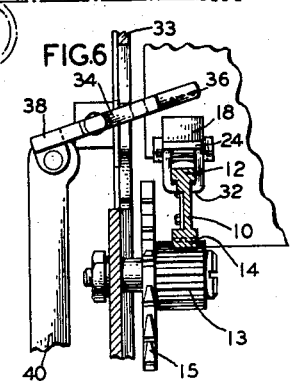
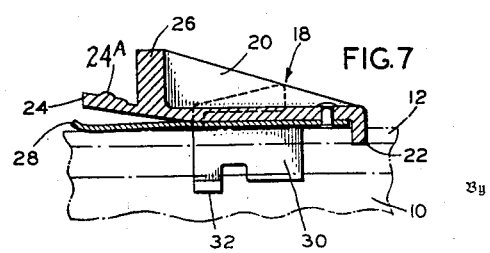
Inventor
FREDERICK W. SCHREMP
WILLIAM J. VICKERY
Attorney

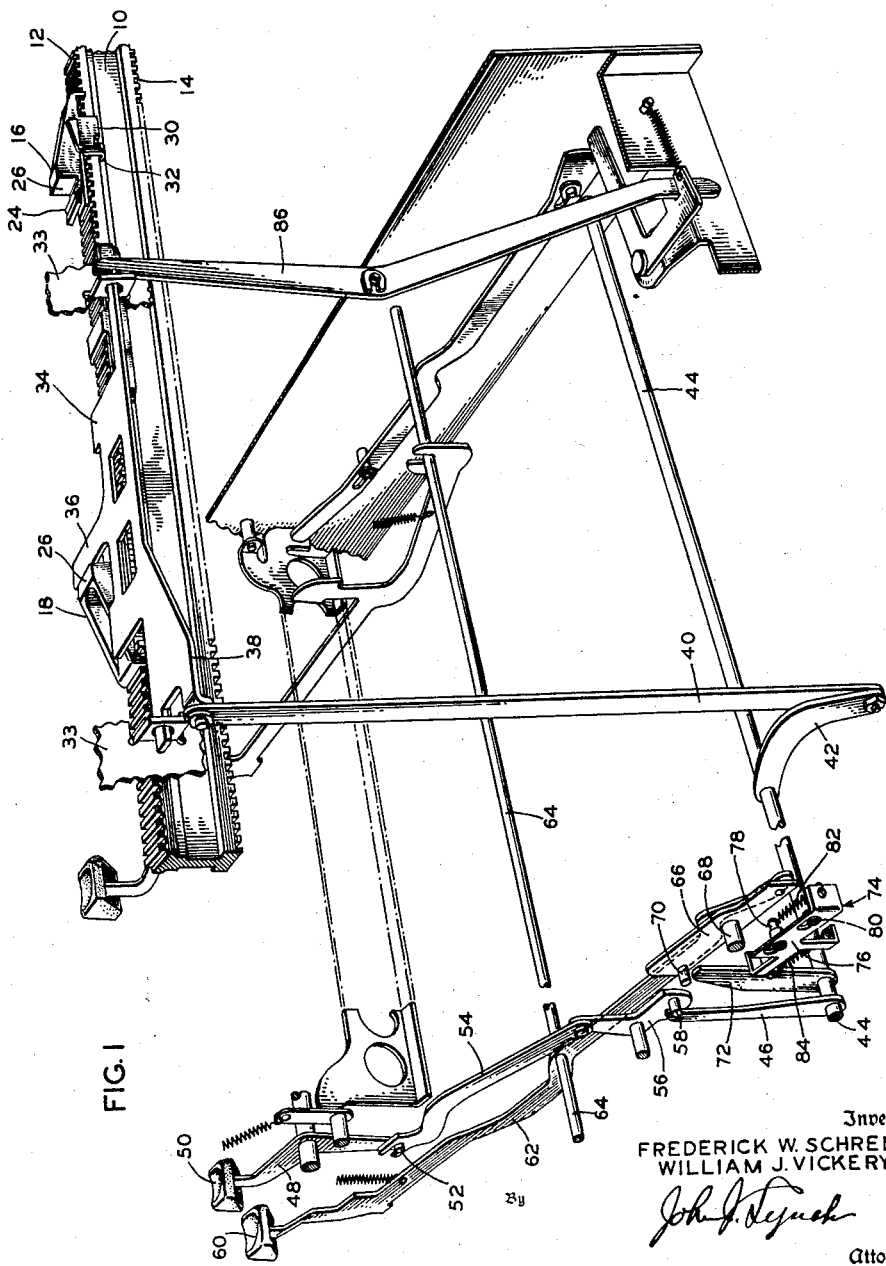

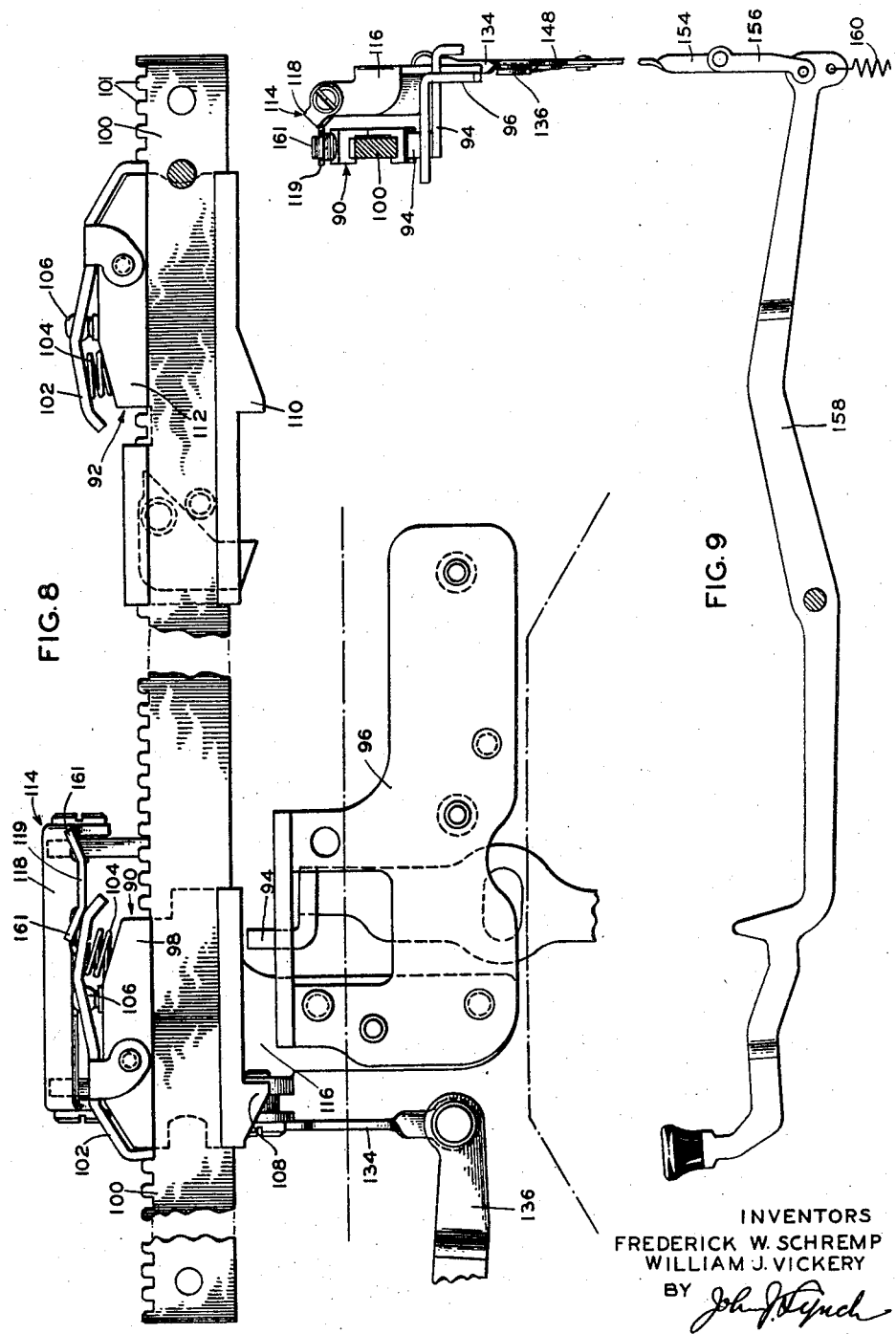

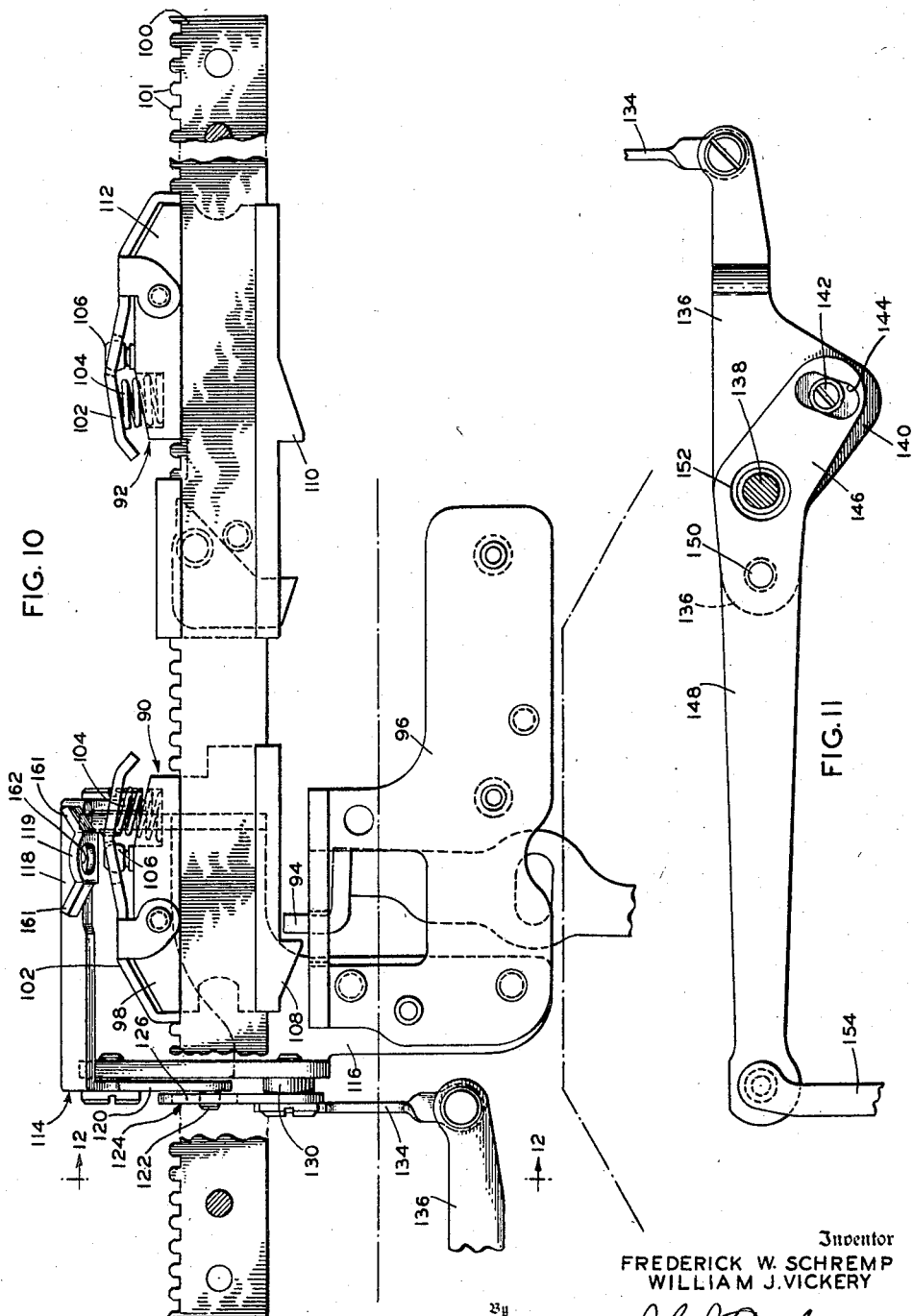

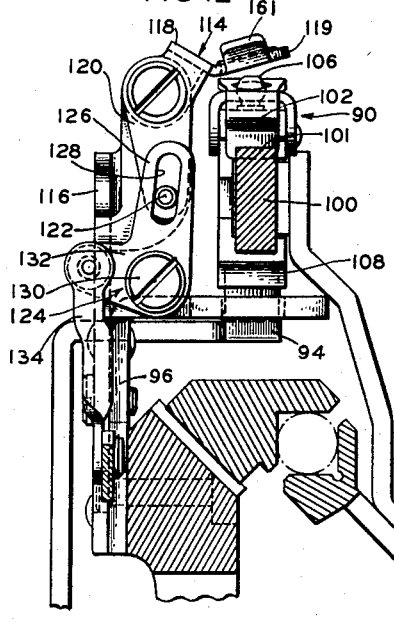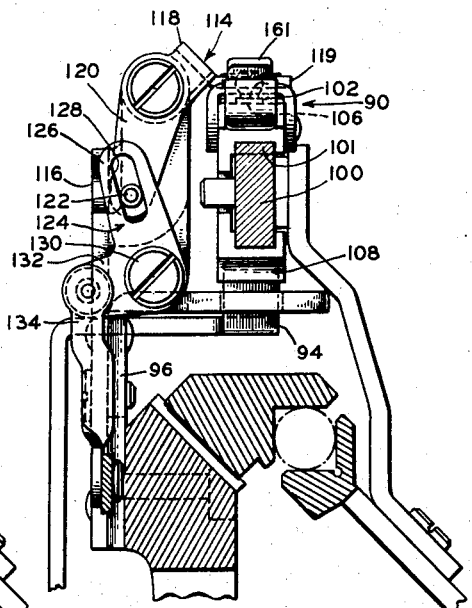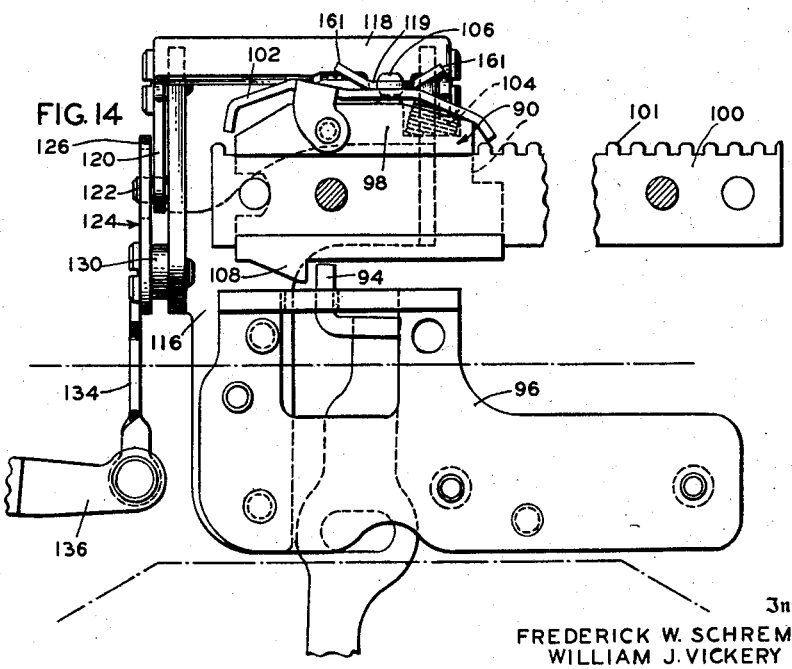

March 29, 1960   F. W. SCHREMP ET AL   2,930,466
MARGIN CONTROL FOR TYPEWRITERS
Original Filed April 7, 1951   7 Sheets-Sheet 6

Inventor
FREDERICK W. SCHREMP
WILLIAM J. VICKERY
By
Attorney

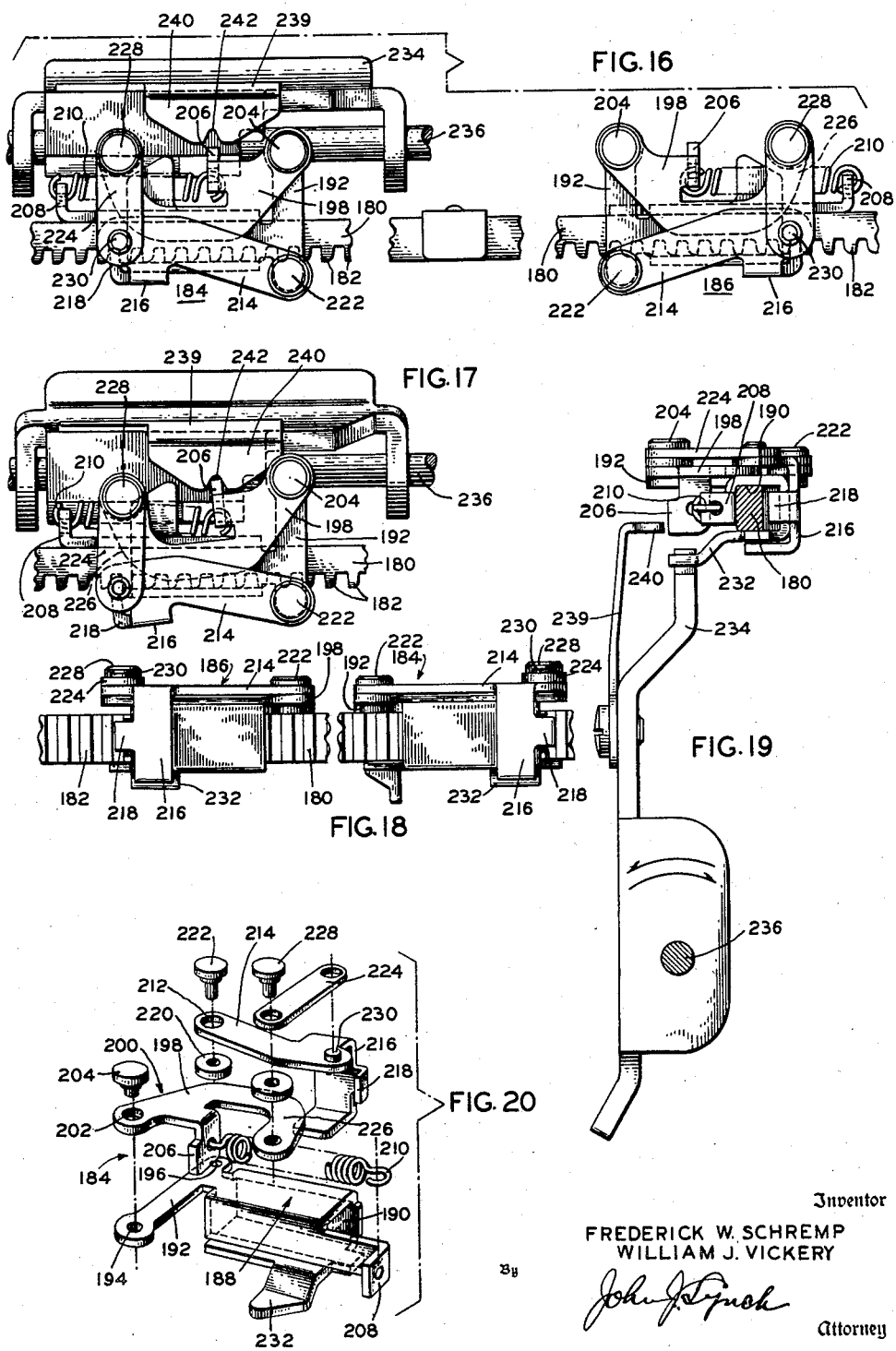

United States Patent Office 2,930,466
Patented Mar. 29, 1960

2,930,466

MARGIN CONTROL FOR TYPEWRITERS

Frederick W. Schremp, Stamford, Conn., and William J. Vickery, Elmira, N.Y., assignors to Sperry Rand Corporation, New York, N.Y., a corporation of Delaware Original application April 7, 1951, Serial No. 220,276, now Patent No. 2,803,329, dated August 20, 1957. Divided and this application November 30, 1956, Serial No. 625,543

5 Claims. (Cl. 197—63)

This invention relates generally to typewriter margin control mechanisms and in particular to key-operated mechanisms for selectively and remotely regulating carriage margin stops.

Conventionally, typewriters are provided with movable carriages upon which the paper-carrying platens are mounted. Also secured to the carriage and movable therewith is a serrated bar arranged to receive stop members thereon disposable relative to the desired paper margins. Positioned within the path of travel of the margin stop members and affixed to the typewriter frame is a center post which cooperates therewith to limit lateral carriage movement. Thus, the manually positionable margin stop members effect a means for regulating the traverse of the typewriter carriage.

The present invention provides improved margin stops and related center post. The instant margin stops are arranged for sliding movement on the carriage rack bar and are pivotally spring-urged into engagement with the teeth thereon. A fixed center post is transversely pivotal under the control of a key to engage either margin stop in one of two selective positions. With the margin control key in normal position, step-by-step movement of the carriage will carry one of the margin stops into engagement with the center post. This engagement limits right-hand carriage traverse. Analogously, the returning carriage effects a similar engagement with the left-hand margin stop and is arrested thereby. The depressing of the margin control key effects the engagement of the center post with a selected one of the respective moving margin stops. In this position, the engaged margin stop is latched by the center post and released from the rack bar. Therefore, the bar is freely movable in either lateral direction. Thus, the carriage may be transported to a new position prior to the release of the margin control key and subsequent re-engagement of the margin stop with the serrated bar. Obviously, either margin stop may be similarly positioned on the rack bar by merely depressing the margin control key and moving the carriage to individually engage a selected stop with the center post. Repositioning the bar relative to the center post and releasing said key will deposit the respective stop on said bar.

Associated with the center post is a margin release key which when actuated moves the center post transversely out of the path of the margin stops to permit the by-passing thereof when so desired.

Essentially, the present invention requires the continued depression of the margin control key to re-set the margin stops by means of moving the carriage. Therefore, a typist may inadvertently strike the margin control key without disturbing the margin stop settings. Heretofore, automatic margin control mechanism having spring-return means, would release the margin stops to return under the influence of said means to the centrally disposed center post when an accidental striking of the control key occurred. This, of course, required the re-setting of the margin stops before typing could be resumed.

In the drawings:

Fig. 1 is a fragmentary perspective rear view of the invention showing the center post engaged by a margin stop in normal margin limiting position.

Fig. 2 is a fragmentary front elevational view of a typewriter carriage rack bar with both of the margin stops engaging the teeth of the rack.

Fig. 3 is a fragmentary front elevational view of the rack bar having one of the margin stops pivotally released for sliding movement thereon.

Fig. 4 is a side elevational view showing the center post in normal margin stop engaging position.

Fig. 5 is a side elevational view of the center post pivoted to release a margin stop for sliding movement of the rack.

Fig. 6 is a side elevational view of the center post pivoted away from the margin stop to permit the passage thereof.

Fig. 7 is a longitudinal cross section through a margin stop.

Fig. 8 is a fragmentary front elevational view of another embodiment of the invention.

Fig. 9 is a fragmentary side elevation of the embodiment shown in Fig. 8 showing the key-operated center post actuating linkage.

Fig. 10 is a fragmentary front elevational view of the center post control mechanism in normal position.

Fig. 11 is a front elevation of a portion of the margin key linkage.

Fig. 12 is a cross section taken on line 12—12 of Fig. 10 showing the center post in normal position.

Fig. 13 is a cross section similar to Fig. 12 showing the center post actuated to release a margin stop for relative sliding movement of the rack.

Fig. 14 is a detailed front elevation of a released margin stop, as shown in Fig. 13, prepared for sliding movement of the rack bar.

Fig. 16 is a fragmentary enlarged plan view showing margin stops on a rack bar having vertically disposed teeth thereon and with the center post in normal position.

Fig. 17 is a fragmentary plan view of a margin stop released by the actuated center post for relative movement of the rack bar.

Fig. 18 is a detailed front elevation of the margin stops.

Fig. 19 is a side elevation of the center post mechanism and a margin stop.

Fig. 20 is an exploded perspective view of a margin stop.

Figure 15:
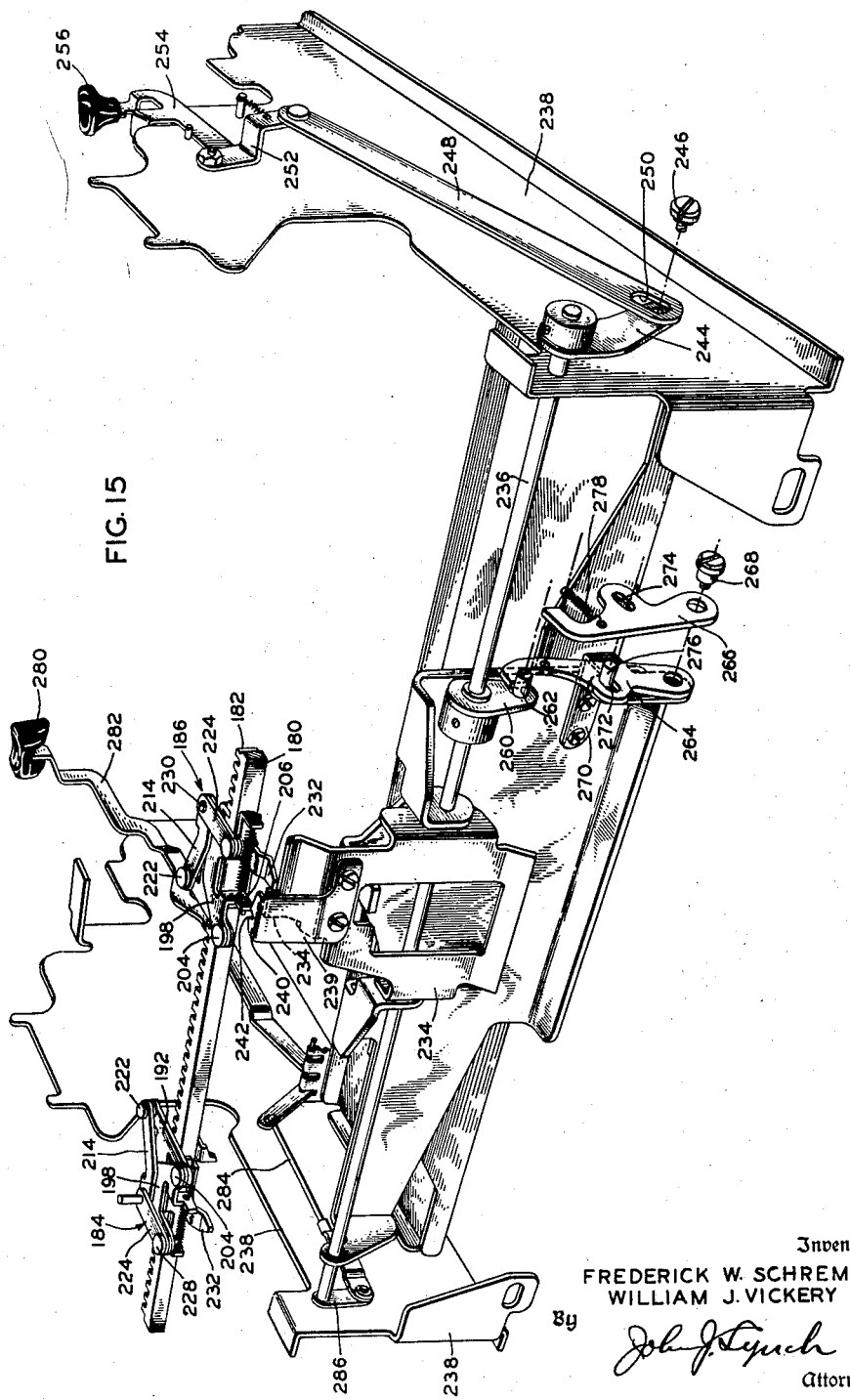
Fig. 15 is a perspective rear view of a further embodiment of the invention.

Referring to Fig. 1, the invention is shown with the non-essential elements of the typewriter omitted. The rack bar 10 is mounted on the typewriter carriage, not shown, and is laterally movable therewith. The bar 10 being substantially I-shaped has teeth 12 and 14 respectively, on the upper and lower surfaces thereof. Bar 10 is a combination of a margin stop rack bar and a carriage spacing rack bar. By means of simultaneous teeth-cutting operations, during manufacture, teeth 12 and teeth 14 are accurately disposed relatively to one another. Therefore, the time-consuming and exacting alignment operation previously required in the assembly of typewriters having separate spacing and margin stop rack bars is completely eliminated. Teeth 14 are engaged by escapement wheel 13, Fig. 2, of a spacing mechanism 15 and by means thereof, the carriage has step-by-step movement with each character printing or each spacing operation.

The margin control mechanism according to the invention has teeth 12 disposed on the upper edge of bar 10. Positioned over teeth 12 are margin stops 16 and 18 which are similar in construction but which are oppositely disposed. The margin stops, Fig. 7, each consist of a body member 20 having a substantially flat base with a downwardly extending projection 22 at one terminal thereof. The opposite lateral terminal has an inclined projection 24 with an inwardly spaced and vertically disposed abutment 26 thereon. Extending laterally and secured to body member 20 is a leaf spring 28. The remaining elements of the margin stops are side members 30 dependent from body member 20 and formed with an inwardly extending flange 32 at the lower terminal thereof. Side members 30 are spaced apart a distance in excess of the width of bar 10 and are retained thereon by the flanges 32, engaging opposite sides of the web portion of the rack bar below the enlarged head on the upper edge. When mounted on bar 10, projections 22 are urged into engagement with teeth 12 by leaf springs 28. Downwardly exerted pressure on projection 24 pivots latching projection 22 out of engagement with teeth 12 for sliding movement of the stops along bar 10.

A center post 34 is centrally mounted on typewriter frame 33 for transverse pivotal movement. An arm 36, extending forwardly, overlies bar 10 and is spaced sufficiently therefrom to engage abutments 26 of margin stops 16 and 18 when the carriage is moved past center post 34. Thus, center post 34 will engage stop 18 and limit leftward travel of carriage carried bar 10, as viewed by the operator and similarly, stop 16 will limit the rightward movement of bar 10.

Means are provided whereby stops 16 and 18 may be re-set by movement of the typewriter carriage. A link 40 is pivotally secured to rearwardly projecting arm 38 of center post 34 at one end and is pivotally secured to arm 42 at the other end. Arm 42 is secured to transverse shaft 44 journalled in the typewriter frame, not shown. An upwardly extending arm 46 is mounted on shaft 44. A bell-crank 48 has a margin control key 50 on one end and stud 52 on the other end. A link 54 is pivotally secured at one end to one arm of pivotally mounted bell-crank 56. The other end of link 54 is bifurcated and engages stud 52. The other arm of bell-crank 56 has stud 58 abutting the free end of arm 46. Manual depression of margin control key 50 moves link 54 rearwardly effecting a partial rotation of bell-crank 56. Stud 58 then moves arm 46 counter-clockwise, as shown in Fig. 1, turning shaft 44 in a similar direction. Arm 42 raises link 40 to pivot center post 34 counter-clockwise. Arm 36 of center post 34 is previously arranged to abut against margin stop 18, therefore, projection 24 thereon is disposed under center post arm 36. Arm 36 has a recess 36A in the lower face to receive a rib 24A formed on the upper central portion of projection 24. As shown in Figs. 3 and 5, pressure of arm 36 on projection 24 pivots the margin stop to raise the latching projection or detent 22 away from teeth 12 on bar 10. Leaf spring 28 provides a relatively non-frictional surface so that bar 10 may be moved laterally in either direction without moving the pivoted margin stop with the rib on projection 24 received in the recess of the arm 36. The manual positioning of a selected portion of bar 10 under the margin stop latch detent and the subsequent release of key 50 effects a re-setting of the margin stop on bar 10. An analogous operation re-sets the other margin stop to any desired position.

To render the center post ineffective, a margin release key 60 and related mechanism, Figs. 1 and 6, may be actuated to produce a clockwise rotation of shaft 44. Arm 42, link 40 and center post 34, therefore, raise arm 36 away from the path of travel of the margin stop and the margin stops may freely pass center post 34. Key 60 is disposed on the typewriter keyboard and is secured to a lever 62 which extends rearwardly to terminate adjacent shaft 44. Lever 62 is centrally pivoted on transverse shaft 64 suitably journalled in the typewriter frame, not shown. A lever 66 is centrally journalled on a shaft 68 and has one end pivotally connected to the rear end of lever 62 and has a stud 70 mounted on the other end. Arranged to be engaged by stud 70 is an arm 72 secured to and rotatable with shaft 44. Key 60, when depressed, pivots lever 62 about shaft 64 in turn rotating lever 66 and engaging stud 70 with arm 72. Shaft 44 is rotated clockwise with arm 72 moving arm 42, link 40 and post 34 in a clockwise direction. Arm 36 is raised away from the normal margin stop engaging position. Lever 62 is spring returned upon release of manual pressure on key 60 and spring balancing mechanism 74 accurately returns the center post to normal position. Mechanism 74 consists of a T-shaped plate 76 having plural slots formed in the bridge portion. Pins 78 and 80 secured to the typewriter frame, not shown, engage in the slots in plate 76. A spring 82 is secured to the free terminal of pin 78 and to the rear terminal of plate 76. Spring 82 urges plate 76 forwardly to engage the portions thereof at the rearward limits of the respective slots with pins 78, 80. A spring 84 is disposed between the base of plate 76 and arm 72 and urges arm 72 into engagement with the forward terminal of plate 76. When key 60 is depressed, plate 76 is moved rearwardly, increasing the tension of spring 82 and decreasing the tension of spring 84. Spring 82 exerts tension greater than spring 84 and therefore, upon release of key 60 spring 82 returns plate 76 and arm 72 to the starting positions. Spring 84 acts independently to return shaft 44 to starting position when key 50 is released. As shown in Figs. 1 and 7, body portions 20 of margin stops 16, 18, are inclined downwardly from aboutment 26 to latch projection 22. Therefore, should the margin stops by-pass the center post, it is not necessary to retain the margin release key in depressed position during carriage return operations. Center post arm 36, in normal position, will be cammed upwardly by the inclined margin stop with the spring balancing mechanism yielding therewith. After the margin stop has passed arm 36, the said arm is returned to normal by the said spring balancing mechanism.

Associated with center post 34 is a keyboard locking mechanism actuable through a lever 86 which has one end abutting against center post 34. Thus, when center post 34 is engaged by margin stop 18, post 34 moves to the right, as viewed in Fig. 1, a distance less than one character space, but sufficient to move lever 86 to keyboard latching position. The remaining elements of the keyboard latching mechanism are substantially conventional, therefore, the detailed description thereof has been omitted.

Thus, the novel center post 34 will limit carriage traverse; re-set margin stops 16, 18; release the carriage to by-pass said margin stops, or actuate the key lock mechanism.

Another embodiment of the instant invention is illustrated in Figs. 8 to 14, inclusive, wherein a modified form of the margin stops and center post is disclosed. A pair of margin stops 90, 92 are mounted on rack bar 100 and arranged to be latched to teeth 101 thereon. Margin stops 90, 92 are, as in the preferred embodiment, slidable along bar 100 to selectively limit the traverse of a typewriter carriage, not shown. Co-operable with the respective margin stops is a center post 94 mounted on the typewriter frame, not shown, by means of a post mounting plate 96. Margin stops 90, 92 are substantially similar in construction, except for minor differences which will be hereinafter apparent.

Margin stop 90 consists of a body member 98 having a lateral bore open along one side thereof and being of such dimensions as to loosely encompass bar 100. The upper or bridge portion of body member 98 has pivotally mounted thereon a latching lever 102 having a detent arm thereon, arranged to engage bar 100 between teeth 101. Compressed under the other arm of lever 102 is a coil spring 104 which is secured in a suitable recess in body member 98. Therefore, spring 104 normally urges latching lever 102 into engagement with the teeth on bar 100, thus securing margin stop 90 to bar 100. Upwardly extending stud 106 secured to body member 98 projects through an aperture in the lever 102. Dependent projection 108 on the base of body member 98 is engageable by center post 94 to limit the traverse of bar 100. Thus, margin stop 90 may be slidably positioned on the bar 100 to provide a variable left hand margin stop.

The right hand margin stop 92, as viewed in the drawings, is of similar construction, except that the face of dependent projection 110 thereon is reversed to abut against center post 94 when traveling from right to left. Further, the relative positioning of stud 106 and coil spring 104 on the stop body 112 is reversed from that of the stop body 98. Stop 92 is analogously variable on bar 100 to selectively determine the right hand margin.

A key-operated margin control mechanism 114 mounted on center post frame 96 controls margin stops 90, 92. Mechanism 114 consists of frame piece 116 secured to frame 96 and extends upwardly therefrom to project above bar 100. A camming latch plate 118 having a transversely extending arm 119 and a dependent arm 120 is pivotally mounted on the upper terminal of frame piece 116. Arm 120 has a stud-mounted roller 122 thereon. A bell-crank 124 has an arm 126 with a slot 128 therein, arranged to pivotally actuate latch plate 118. Roller 122 is slidable in slot 128. Bell-crank 124 is pivotally mounted on frame piece 116 by means of stud 130 and has arm 132 projecting outwardly therefrom. Pivotally secured to arm 132 is a short link 134, the other end of which is pivotally secured to lever 136. Lever 136 is journalled on stud 138 and has an arm 140 dependent therefrom. An adjustable screw 142 is mounted on arm 140 and cooperates with slot 144 provided in arm 146 of lever 148. Stud 150 pivotally secures lever 148 to lever 136. To permit relative adjustment between levers 136, 148, lever 148 has an aperture 152 formed in the apex of arm 146 in which stud 138 is disposed. Stud 138 is of lesser diameter than aperture 152 to provide for limited movement of lever 148 relative thereto. A link 154 pivotally connects lever 148 to a link 156. Link 156 is pivotally secured to key-operated lever 158. As shown in Figs. 9, 11 and 14, the depressing of the key on lever 158 raises one arm thereof against the tension of spring 160 and through links 154, 156 pivots levers 148 and 136 about stud 138 to move link 134 downward. The descending link 134 effects a counterclockwise rotation of bell-crank 124, Fig. 13. Bell-crank 124 through slot 128 and roller 122 pivots latch plate 118 and arms 119, 120 thereon, clockwise. The adjustment screw 142 provides a means for equalizing the position of the margin control key with respect to other keys on a keyboard, not shown.

Latch arm 119 is provided with two angularly disposed and oppositely extending camming lugs 161 with an aperture 162 centrally formed therebetween. With latch arm 119 depressed, movement of carriage carried bar 100 therepast will effect engagement of a lug 161 with margin stop latch lever 102, Fig. 8. Continued lateral movement of bar 100 cams lever 102 downwardly against the tension of spring 104 and pivots the latching detent thereon an amount insufficient to disengage said detent from teeth 101. Lug 161 cams against stud 106 and through the linkage, heretofore described, yields therewith, permitting the latch detent to normalize. However, continued movement brings stud 106 into alignment with aperture 162 thereby permitting latch arm 119 to return to depressed position. Latch arm 119 engages margin stop lever 102, depressing said lever to pivot the latching detent thereon out of engagement with teeth 101 on bar 100, Fig. 14. Thus, bar 100 is free to slide laterally through the bore of the margin stop. Subsequent release of the margin control key effects a counterclockwise movement of latch arm 119 and the margin stop is again affixed to bar 100.

Continued depression of the margin control key accompanied with lateral movement of carriage bar 100 will release the respective margin stop regardless of the position of said stop on bar 100. Either margin stop may be selectively released and re-set by means of the margin control mechanism.

Center post 94 is movable downwardly by means not shown, to permit passage of the respective margin stop projections when it is desirable to exceed the stop defining margins. A margin release key, not shown, controls this operation in a conventional manner.

A further embodiment of the invention is shown in Figs. 15, 16, 17, 18, 19 and 20, wherein a rack bar 180 has teeth 182 disposed on one side thereof. Margin stops 184 and 186 are slidably mounted on bar 180 and may be adjustably positioned to determine the left and right hand carriage margins. Margin stop 184, Fig. 20, consists of a body member 188 provided with a centrally disposed lateral bore 190. Bore 190 is arranged to receive bar 180 therein. An arm 192 is formed from body member 188 and extends transversely of the bore 190. Arm 192 is provided with terminal apertures 194 and 196, respectively. Disposed on arm 192 is arm 198 of a substantially U-shaped member 200. The terminal of arm 198 has therein an aperture 202, which is aligned with aperture 194. A stud 204 journalled in apertures 194, 202 pivotally secures member 200 to the body 188. Dependent from arm 198 of member 200 is a projection 206 which coacts with a projection 208 extending from body 188 to tension spring 210 therebetween.

An aperture 212 in arm 214 is alignable with aperture 196 in arm 192 of body 188. Arm 214 extends parallel with the body 188 and has formed on one end thereof a latch plate 216 of substantially U-shape having detent 218 projecting inwardly from the vertically disposed base thereof. Apertures 212 and 196 are aligned with a washer 220 therebetween and related arms 192, 214 are pivotally secured one to the other by stud 222 passing therethrough.

One end of a link 224 is pivotally secured to arm 226 of member 200 by a stud 228. The other end of link 224 is pivotally secured to a protrusion 230 on arm 214 of latch plate 216.

When assembled with the bar 180 disposed in the bore 190, detent 218 is urged by spring 210 into engagement with teeth 182.

Margin stops 184 and 186 are substantially analogous in structure with minor differences existing in the relative positioning of the components. Operationally, margin stops 184 and 186 are identical.

A lug 232 projects rearwardly from body 188 to engage center post plate 234 and be arrested thereby. Therefore, bar 180 having margin stops 184, 186 spaced thereon will be limited in lateral movement to the positioning of the respective stops. Center post plate 234, Fig. 15, is secured to a shaft 236 journalled in frame pieces 238. A latch release member 239 having an inwardly extending flange 240 thereon is secured to plate 234. A notch 242 is provided in tapered flange 240. Center post plate 234 is pivotally mounted, therefore, latch release member 239 with flange 240 thereon, is movable into engagement with projection 206 of the margin stop. A key-operable mechanism is provided to control said pivotal movement. An arm 244 secured to shaft 236 has a stud 246 detachably secured to the end thereof. A link 248 having a slotted aperture 250 therein is pivotally secured to arm 244 by means of stud 246 riding in the slot. The other end of link 248 is pivotally secured to a lever 252 which is secured to key-operated lever 254. Depressing the margin control key 256 effects a rearward movement of link 248. The length of movement is greater than the length of slot 250, therefore, arm 244 and shaft 236 are moved clockwise. Center post plate 234 similarly moves clockwise and latch release member 239 is positioned for the camming flange 240 thereon to engage latch stop projection 206. Should the margin stop not be aligned with the center post, then traversing movement of carriage-carried bar 180 toward the center post will cause projection 206 to engage the respective camming surfaces of flange 240. Projection 206 will be cammed inwardly until latched by notch 242. With projection 206 engaged by notch 242, Figs. 16 and 17, detent 218 of the margin stop is disposed out of engagement with teeth 182 on bar 180. The novel construction of the margin stops is designed to effect a substantially linear entry and withdrawal of detent 218. In this manner undesirable binding of the detent between teeth 182 is eliminated. Continued lateral movement of bar 180 will reposition said bar relative to the now stationary margin stop. Subsequent release of key 256 and re-setting of the related linkage will permit center post plate 234 and latch 239 thereon, to return to normal and out of engagement with the margin stop projection. Margin stop spring 210 returns detent 218 into engagement with teeth 182 on bar 180 and said margin stop is latched in effective margin defining position, Fig. 16.

A spring balancing mechanism is provided to normally position center post plate 234 whereby lugs 232 of the respective margin stops will abut thereagainst and terminate carriage traverse. As shown in Fig. 15, an arm 260 is secured to shaft 236 and extends downward therefrom. A stud 262 secured to the end of arm 260 is disposed to oppositely engage stud levers 264, 266. Said levers are pivotally mounted at the base terminals thereof on a common stud 268, secured to a bracket 270 which is mounted on the typewriter frame. Slotted apertures 272, 274 are centrally disposed in levers 264, 266, respectively. A second stud 276 is secured to bracket 270 and extends through slotted apertures 272, 274. A spring 278 interconnects levers 264, 266 and has sufficient tension to effect equal engaging pressure of the respective levers on stud 276. Thus, shaft 236 and center post plate 234 are retained in a normal position by levers 264, 266. When key 256, the margin control key, is actuated, lever 266 is moved outwardly against the tension of spring 278. Subsequent release of said key permits spring 278 and lever 266 to return arm 260 to normal thereby normalizing center post plate 234.

Conversely, if margin release key 280 is depressed, shaft 236 through lever 282, link 284 and arm 286 is oppositely rotated and lever 264 is displaced against the tension of spring 278. Center post plate 234 is pivoted away from margin stop lugs 232 and carriage bar 180 is free to pass said center post plate. Slot 250 in link 248 of the margin control linkage compensates for the counter rotation of shaft 236.

Release of key 280 permits the related mechanisms to return to normal under the influence of spring 278.

This application is a division of our application Serial No. 220,276 filed April 7, 1951, for Margin Control for Typewriters, now Patent No. 2,803,329 granted August 20, 1957.

While we have described what we consider to be highly desirable embodiments of our invention, it is obvious that many changes in form could be made without departing from the spirit of our invention, and we, therefore, do not limit ourselves to the exact form herein shown and described, nor to anything less than the whole of our invention as hereinbefore set forth and as hereinafter claimed.

The invention claimed is:

1. In a typewriter having a frame and a carriage laterally movable thereon, a margin control mechanism comprising a serrated rack bar secured to said carriage, a pair of laterally slidable margin stops disposed on said bar, each of said stops having spring-urged detents engageable with serrations on said bar, a centrally disposed center post means pivotally secured to said frame and arranged for abutting engagement with said stops, a latch mechanism carried by and movable with said post means, key controlled linkage operable to pivot said latch mechanism into engaging relation with said stops, and complemental latch engaging means disposed on each margin stop, said engaging means being responsive to said latch mechanism to release the respective margin stop spring-urged detent and latch said stop in fixed relation with said center post.

2. In a typewriter having a frame, a carriage laterally movable thereon, a rack bar secured to said carriage, a pair of margin stops laterally disposed thereon, a centrally disposed center post means arranged for engagement with said stops, the provision of means whereby said stops may be adjustably positioned along said bar by a remote key, said positioning means comprising a latch mechanism secured to said center post means and providing a central aperture and cam edges flanking said aperture, yieldable spring-tensioned detents disposed on said stops and adapted for engagement with the cam edges of said latch mechanism, key controlled linkage operable to pivot said latch mechanism into engagement with said detents, said detents being pivotally responsive to said latch mechanism, and complemental latching elements disposed on said stops and engageable in the aperture of said latch mechanism whereby said engaged stop is secured to the center post means while the carriage bar moves to a selected position and subsequent release of said key-operative linkage deposits said stop thereon.

3. In a typewriter having a frame and carriage laterally movable thereon, a rack bar secured to said carriage, a pair of margin stops laterally disposed and slidable on said bar, each of said stops having a detent lever thereon spring-urged into engagement with the rack bar, a detent lever protrusion and a lug extending rearwardly therefrom, a center post means secured to a transverse shaft journalled in said frame, a latching member mounted on said post means, spring-balancing mechanism cooperable with said shaft to normally position said post means for engagement by said lug and position said latching member clear of said protrusion, key controlled linkage operable to pivot said shaft and center post means inwardly toward said bar, the inwardly disposed latching member being arranged to engage said protrusion and move the same inwardly toward said bar to release said detent lever, and said carriage-carried bar being transversely slidable relative to the latched margin stop.

4. A typewriter as set forth in claim 3, including another key controlled linkage operable to pivotally move said shaft and post means thereon away from said bar thereby permitting the stop lugs to traverse the center post means.

5. A typewriter as set forth in claim 1, including a key operated rock shaft on which said center post means is mounted for rocking movement, an arm on said shaft, and a spring balancing means for yieldably maintaining said center post means in a predetermined normal position, said spring balancing means including stud levers engaged by said arm for yieldably holding said shaft in a position corresponding to the normal position of said center post means.

References Cited in the file of this patent

UNITED STATES PATENTS

| | | |
|---|---|---|
| 1,130,804 | Dillon | Mar. 9, 1915 |
| 1,134,101 | Briggs | Apr. 6, 1915 |
| 1,594,379 | Ramus | Aug. 3, 1926 |
| 1,748,896 | Olivetti | Feb. 25, 1930 |
| 2,209,279 | Myers | July 23, 1940 |
| 2,316,666 | Bredimus | Apr. 13, 1943 |
| 2,684,146 | Sagner | July 20, 1954 |
| 2,803,329 | Schremp et al. | Aug. 20, 1957 |